United States Patent [19]

Roberson

[11] Patent Number: 4,850,409
[45] Date of Patent: Jul. 25, 1989

[54] FELLING SAW AND METHOD OF OPERATING

[75] Inventor: William C. Roberson, Murfreesboro, N.C.

[73] Assignee: Franklin Equipment Company, Franklin, Va.

[21] Appl. No.: 73,545

[22] Filed: Jul. 15, 1987

[51] Int. Cl.$^4$ .............................................. A01G 23/08
[52] U.S. Cl. ................................... 144/336; 30/379.5; 83/928; 144/3 D; 144/34 R
[58] Field of Search ...................... 30/379.5; 83/928; 144/2 Z, 3 D, 34 R, 34 E, 335, 336, 338, 339, 343

[56] References Cited

U.S. PATENT DOCUMENTS

| | | | |
|---|---|---|---|
| 3,796,242 | 3/1974 | Albright | 83/928 |
| 3,885,610 | 5/1975 | Forslund et al. | 144/3 D |
| 3,902,538 | 9/1975 | Muirhead | 144/34 R |
| 3,976,111 | 8/1976 | Jonsson | 144/34 R |
| 3,991,799 | 11/1976 | Albright | 144/3 D |
| 3,996,981 | 12/1976 | Bruun | 144/34 R |
| 4,116,250 | 9/1978 | Ericsson | 144/34 R |
| 4,127,154 | 11/1978 | Kabotoff | 144/3 D |
| 4,161,200 | 7/1979 | Albright | 144/34 R |
| 4,219,059 | 8/1980 | Albright | 144/34 R |
| 4,434,827 | 3/1984 | Franklin | 144/336 |
| 4,437,500 | 3/1984 | LaRose | 144/34 R |
| 4,467,849 | 8/1984 | Denis | 30/379.5 |
| 4,491,163 | 1/1985 | Kurelek | 144/356 |
| 4,537,236 | 8/1985 | Kulju | 144/336 |
| 4,552,191 | 11/1985 | Kuusilinna | 144/3 D |
| 4,653,555 | 3/1987 | Mellgren | 144/3 D |

Primary Examiner—W. Donald Bray
Attorney, Agent, or Firm—Cushman, Darby & Cushman

[57] ABSTRACT

An improved tree-felling apparatus which can be mounted to a motive power device such as a tractor, includes a cradle having upper and lower saddle members for receiving a tree, a plurality of grab arm members for pulling the tree in toward the saddle members, a pivotable chain saw bar mounted in the lower saddle member and an extendable penetrating tree spike retractably mounted within a recess above the chain saw bar for securing the tree against downward movement during cutting.

20 Claims, 3 Drawing Sheets

FELLING SAW AND METHOD OF OPERATING

BACKGROUND OF THE INVENTION

1. Field of the invention

The present invention relates to tree harvesting devices. More particularly, the present invention relates to tree harvesting devices which can be advantageously mounted on a mobile vehicle such as a tractor.

2. Description of the prior art

A number of tractor mounted tree harvesting devices are currently available to the logging industry which can fell trees in a faster and safer manner than can be done by means of a hand-operated chain saw. An early example of a tractor mounted tree harvesting device is disclosed in U.S. Pat. No. 4,161,200 to Albright. In this apparatus, a tree to be harvested may be pulled into a tree cradle by a pair of grab arms that are mounted on the tree cradle. Mounted on the cradle are a number of unadjustable stationary knives that prevent the tree from slipping downwardly when grasped by the grab arms. A saddle member which included a pivotable chain saw bar was mounted to the cradle some distance beneath the grab arms and stationary blades for cutting the tree.

A problem in tree harvesting apparatuses typified by the Albright '200 device was that the stationary blades would fail to penetrate some irregularly shaped trees which were clamped to the cradle for cutting, thus allowing the tree to slip downwardly and damage the chain saw bar.

Other devices have since been developed to help hold the tree stationary with respect to the saw while it is being cut. For example, in U.S. Pat. No. 4,491,163 to Kurelek, a fixed blade having a tapered edge is provided to enter the kerf after the chain saw bar so that the chain saw bar does not ride against the tree while turning. However, as discussed in the Kurelek patent, the function of the plate is more to reduce the horsepower necessary to cut through the tree than for supporting the tree. In addition, the fixed blade in Kurelek failed to prevent horizontal motion from taking place between the tree and the cradle.

In U.S. Pat. No. 4,219,059 to Albright, a movable spike was provided to penetrate the tree stump beneath the chain saw bar to stabilize the cradle with respect to the tree prior to cutting. However, the apparatus had no means other than a pair of grab arms to secure the tree against downward movement with respect to the saw blade during cutting.

It is clear that there is a long and unfilled need in the prior art for a tractor mounted tree felling apparatus having an improved mechanism for preventing a tree from slipping downwardly and pinching or damaging the chain saw blade during cutting.

SUMMARY OF THE INVENTION

It is an object of the present invention to provide a tractor mounted tree felling apparatus that is free from the above-mentioned disadvantages of the prior art.

Specifically, it is an object of the present invention to provide a tree felling apparatus that is effective, safe to operate and has effective means for securing the tree against downward movement during cutting.

In order to attain the aforementioned objects, the present invention includes a tree cradle that is mounted to a tractor by a number of articulation arms, grab arm means on the cradle member for securing the cradle member to a tree that is to be cut, means attached to the cradle member beneath the grab arm means for severing the tree and extendable or adjustable means for penetrating the tree above the severing means, so that an upper portion of the tree is secured against downward movement into the severing means.

The present invention further includes a novel method of felling a tree, which includes positioning the tree cradle next to a tree, penetrating the tree with the extendable means, actuating the grab arms to pull the cradle and the attached penetrating means further into the tree, and cutting the tree with the severing means.

According to a preferred embodiment of the present invention, both the extendable means for penetrating the tree and the tree severing means are retractably housed within recesses which are provided in a saddle member that is attached to a lower portion of the cradle.

Other objects, features, and characteristics of the present invention, as well as the methods and operation and functions of the related elements of the structure, and to the combination of parts and economies of manufacture, will become apparent upon consideration of the following description and the appended claims with reference to the accompanying drawings, all of which form a part of the specification, wherein like reference numerals designate corresponding parts in the various figures.

DETAILED DESCRIPTION OF THE PREFERRED EMBODIMENT

Figure 1:
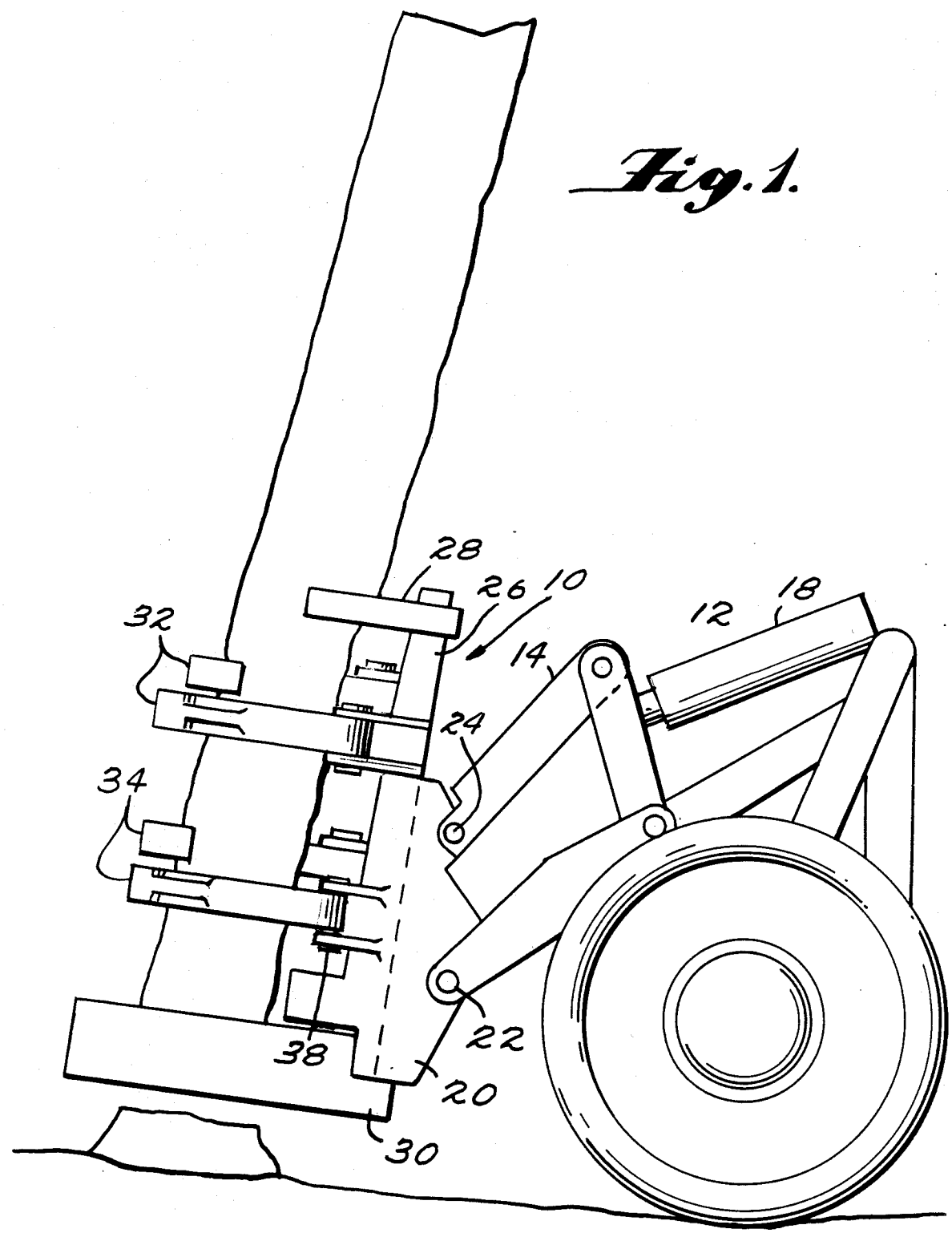
FIG. 1 is a side elevational view of the present invention, as shown in operation.

Referring to FIG. 1, a preferred embodiment of the present invention is illustrated, wherein a tree cradle 10 is attached to a tractor or other motor vehicle 12, by means of a number of manipulatable articulation arms 14, 16. Upper and lower articulation arms 14, 16, which are movable by hydraulic or pneumatic cylinders 18, are attached to a rear support member 20 of the tree cradle 10 by pivot joints 22, 24, respectively.

In the preferred embodiment, tree cradle 10 comprises the rear support member 20, an upper saddle member 28 and a lower saddle member 30 which are formed to receive a tree that is to be cut. Upper saddle member 28 is joined to rear support member 20 and lower saddle member 30 by a pair of vertical support members 26, as shown in FIGS. 1 and 2.

Figure 2:
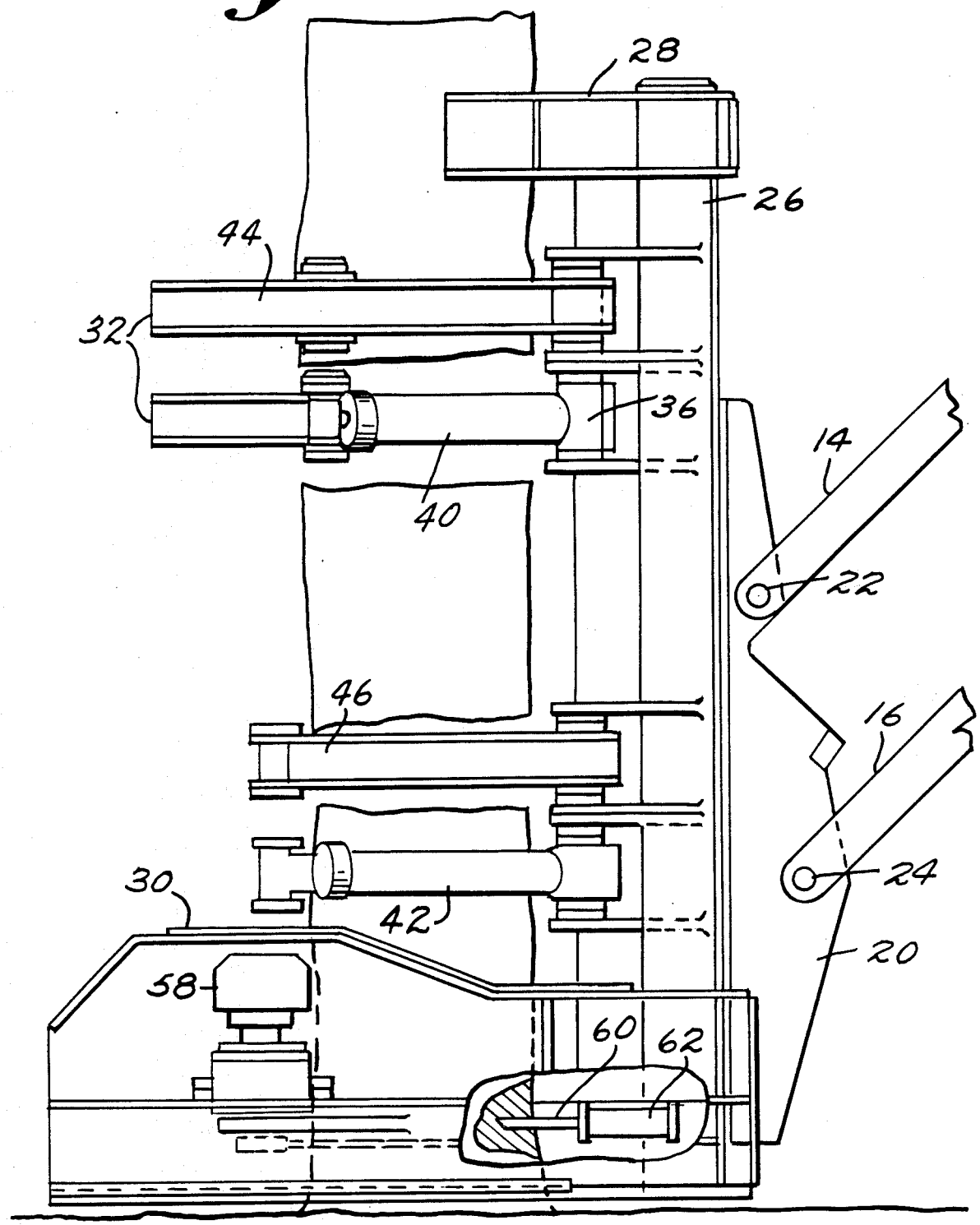
FIG. 2 is a side elevational view of the present invention, with parts broken away for clarity.

A pair of upper and lower grab arm members 32, 34 respectively, are pivotably mounted to tree cradle 10 by hinges 36, 38 as shown in FIGS. 1 and 2. As shown in FIG. 2, hydraulic or pneumatic cylinders 40, 42 are provided on an outer surface of each grab arm to force the grab arm to pivot inwardly so that upper and lower saddle members 28, 30 may be pulled tightly against a tree to be cut. As shown in FIG. 2, the inner surface 44, 46 of each grab arm may be smoothly formed to allow the tree to slide therealong as it is forced inwardly toward saddle members 28, 30, or the surfaces 44, 46 may be roughened to provide additional support for the tree.

Figure 3:
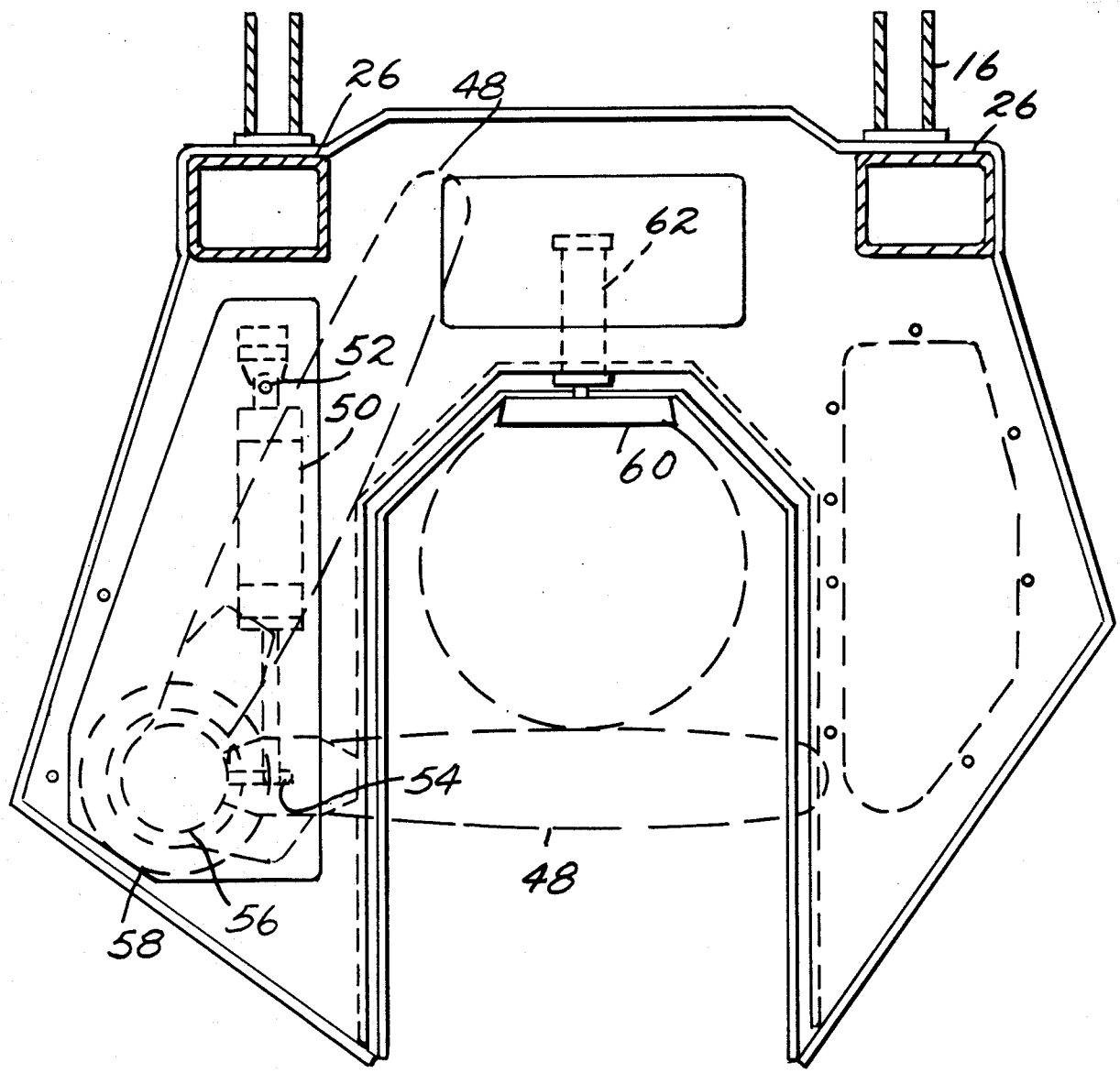
FIG. 3 is a cross-sectional view taken along lines 3—3 in FIG. 2.

As shown in FIG. 3, a chain saw bar 48 is pivotably mounted within a recess 49 in lower saddle member 30. Chain saw bar 48 is pivotable during cutting of the tree from a first position within the recess to a second position subsequent to the cut, as is shown in FIG. 3. In order to pivot chain saw bar 48, a pneumatic or hydraulic cylinder 50 is secured at a first end to lower saddle member 30 by pivot joint 52 and at a second end by pivot joint 54 to the chain saw bar 48. A motor 58 is provided in lower saddle member 30 for driving a sprocket 56 which turns the saw chain on chain saw bar 48 to effect a cut.

A penetrating tree spike or blade 60 is provided within a recess 61 in lower saddle member 30 slightly above the recess 49 for chain saw bar 48. A drive means 62, which in the illustrated embodiment is a pneumatic or hydraulic cylinder, is provided within lower saddle member 30 for linearly extending the penetrating tree blade 60, in order to adjust the position of the blade 60 or drive it into a tree. Alternatively, in another embodiment of the invention, blade 60 may be stationary.

In operation, the motive vehicle or tractor 12 is driven to a location nearby a tree that is to be cut. Tree cradle 10 is then positioned next to the tree by manipulating the articulatable arms 14, 16, such as by extending or contracting hydraulic or pneumatic cylinder 18. Once the tree is roughly positioned within the tree receiving recesses in upper and lower saddle members 28, 30 respectively, drive means 62 may be actuated to drive penetrating tree blade 60 into the tree, thus preventing tilting and turning of the cradle 10 with respect to the tree. Alternatively, blade 60 may first be adjusted by extending it outwardly or inwardly, and the initial positioning of tree cradle 10 may cause the blade 60 to be driven into the tree.

Once the penetrating tree blade 60 has been driven into the tree, grab arms 32, 34 are pivoted by cylinders 40, 42 respectively, to pull the cradle and its upper and lower saddle members 28, 30 tightly against the tree. At the same time, penetrating tree spike 60 is caused to further penetrate the tree by action of the grab arms.

Once the tree has been thus secured to tree cradle 10, cylinder 50 and motor 58 may be actuated to drive the chain saw bar 48 from its first position to the second position as shown in FIG 3, thereby severing the tree. Since penetrating tree spike 60 is driven deeply into the tree at a position that is just slightly above the cut, there is no chance that the upper portion of the tree will shift downwardly and damage the chain saw bar 48 during cutting.

In addition, a tree felling apparatus constructed according to the present invention is safer to use than prior art devices, since both chain saw bar 48 and penetrating tree spike 60 are both retractably receivable within respective recesses in the lower saddle member 30. Clearly, present invention constitutes an important advance in the art that is deserving of patent protection.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

I claim:

1. A method of felling a tree, comprising:
   (a) positioning a tree cradle having at least one pair of grab arms, a pivotable chain saw bar beneath the grab arms and an extendable tree spike above the chain saw bar next to a tree;
   (b) extending the tree spike to penetrate the tree;
   (c) actuating the grab arms to pull the cradle and attached tree spike further into the tree; and
   (d) pivoting the chain saw bar to cut the tree, while the tree spike supports an upper portion of the tree from shifting downwardly onto the chainsaw bar.

2. A method according to claim 1, wherein the tree spike is recessed within the tree cradle prior to step (b).

3. A method according to claim 1, wherein step (a) includes:
   (a) (1) mounting the tree cradle by a number of manipulatable articulation arms to a motive vehicle such as a tractor;
   (a) (2) driving the motive vehicle and attached cradle to a position nearby the tree; and
   (a) (3) positioning the cradle next to the tree with said manipulatable articulation arms.

4. Apparatus for felling a tree, comprising:
   a cradle member;
   grab arm means on said cradle member for securing said cradle member to a tree to be cut;
   means attached to said cradle member beneath said grab arm means for severing the tree; and
   extendable means for penetrating said tree above said severing means, whereby an upper portion of the tree is secured against downward movement into said severing means.

5. Apparatus according to claim 4, wherein said grab arm means comprises;
   at least one pair of grab arms, each grab arm being pivotally mounted to said cradle member; and
   means for pivoting each of said grab arms relative to said cradle member, whereby a tree may be secured between said cradle and an inner portion of each of said grab arms.

6. Apparatus according to claim 5, wherein said pivoting means comprises a hydraulic or pneumatic cylinder.

7. Apparatus according to claim 4, further comprising a saddle member attached to a lower portion of said cradle, and wherein said severing means is housed within a recess in said saddle member.

8. Apparatus according to claim 7, wherein said severing means comprises:
   a chain saw bar pivotally mounted within said recess;
   means for pivoting said chain saw bar out of said recess to engage the tree; and
   means for turning a saw chain on said chain saw bar.

9. Apparatus according to claim 8, wherein said pivoting means comprises either a hydraulic or pneumatic cylinder.

10. Apparatus according to claim 7, wherein said penetrating means is mounted in a second recess in said saddle member.

11. Apparatus according to claim 10, wherein said penetrating means comprises:
    a tree spike; and
    means for linearly driving said tree spike into the tree.

12. Apparatus according to claim 11, wherein said tree spike driving means comprises a hydraulic or pneumatic cylinder.

13. A mobile tree-felling assembly, comprising:
    an all terrain-type vehicle that is suitable for use in logging areas;
    a cradle member attached to said vehicle by a number of manipulable articulation arms;

grab arms means on said cradle member for securing said cradle member to a tree to be cut;
means attached to said cradle member beneath said grab arm means for severing the tree; and
extendable means for penetrating said tree above said severing means, whereby an upper portion of the tree is secured against downward movement into said severing means.

14. Apparatus according to claim 13, wherein said grab arm means comprises:
   at least one pair of grab arms, each grab arm being pivotably mounted to said cradle member; and
   means for pivoting each of said grab arms relative to said cradle member, whereby a tree may be secured between said cradle and an inner portion of each of said grab arms.

15. Apparatus according to claim 14, wherein said pivoting means comprises a hydraulic or pneumatic cylinder.

16. Apparatus according to claim 13, further comprising a saddle member attached to a lower portion of said cradle, wherein said severing means is housed within a recess in said saddle member.

17. Apparatus according to claim 16, wherein said severing means comprises:
   a chain saw bar pivotably mounted within said recess;
   means for pivoting said chain saw bar out of said recess to engage the tree; and
   means for turning a chain saw on said chain saw bar.

18. Apparatus according to claim 16, wherein said penetrating means is mounted in a second recess in said saddle member.

19. Apparatus according to claim 18, wherein said penetrating means comprises:
   a tree spike; and
   means for linearly driving said tree spike into the tree.

20. Apparatus according to claim 19, wherein said tree spike driving means comprises a hydraulic or pneumatic cylinder.

* * * * *